United States Patent Office

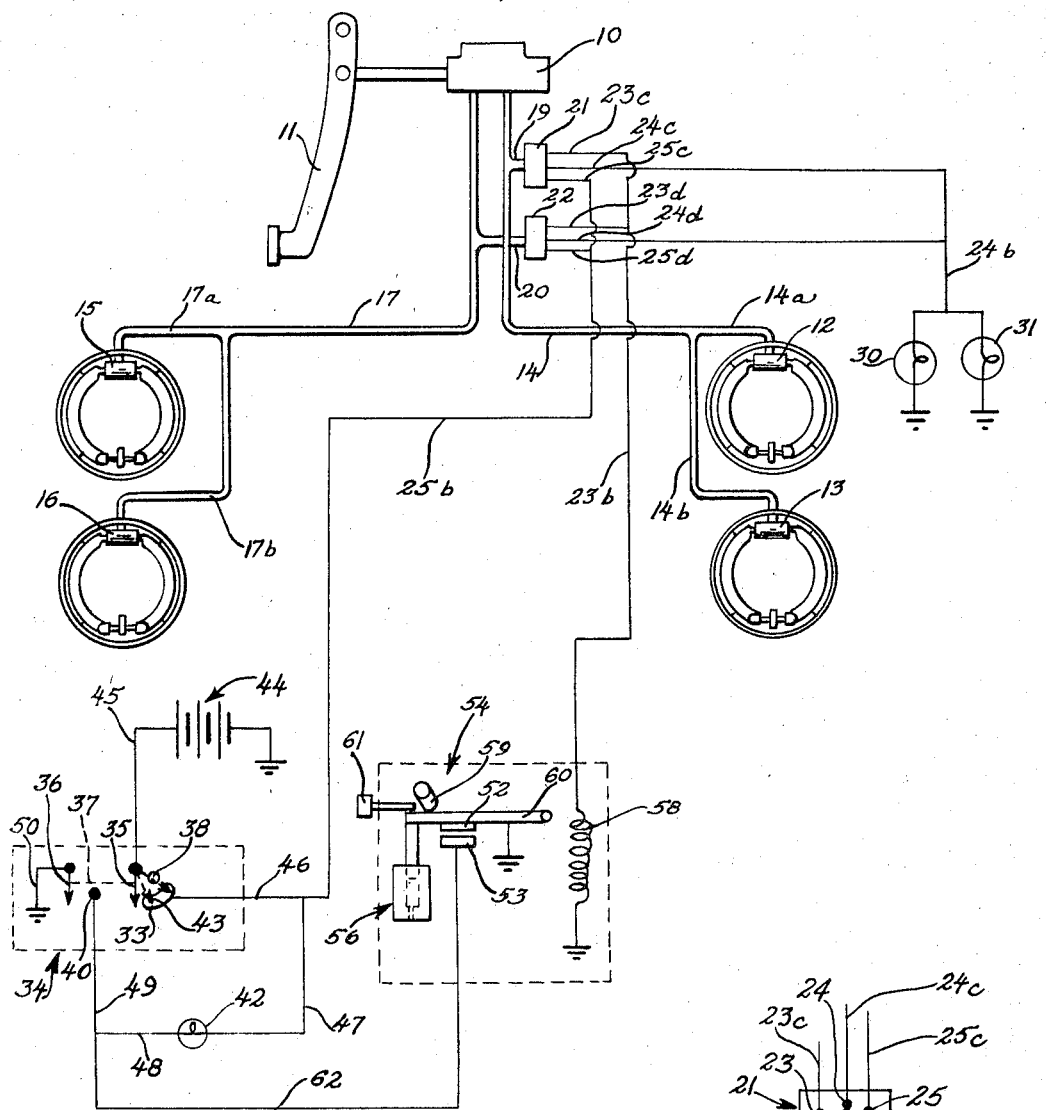

3,423,727
Patented Jan. 21, 1969

3,423,727
DEVICE FOR SIGNALLING FAULTY PERFORMANCE OF A VEHICLE BRAKING SYSTEM
James C. Adamson, Kenosha, Wis., assignor to American Motors Corporation, Kenosha, Wis., a corporation of Maryland
Filed Apr. 4, 1966, Ser. No. 540,050
U.S. Cl. 340—52
Int. Cl. B60q 1/00
5 Claims

ABSTRACT OF THE DISCLOSURE

The invention relates to an electrically operated signalling device installed in a vehicle braking system of the type wherein a dual chambered master cylinder is employed. One chamber supplies brake fluid to the front set of brakes and the other chamber supplies brake fluid to the rear set of brakes. If the performance of one of the sets of brakes is faulty as a result of pressure drop in one chamber, then the signalling device is activated.

---

The invention relates to a warning system incorporated in the braking system of an automotive vehicle wherein a tandem master cylinder provides for dual type brakes. In such a braking system one chamber in the master cylinder supplies brake fluid to the front wheel brakes and a second chamber simultaneously supplies brake fluid to the rear wheel brakes. If either one of the dual systems fails, a warning light will go on until the failure is corrected.

The principal object of the invention then is to provide a warning system for indicating failure in one system of a tandem master cylinder dual braking system.

Other objects and advantages will be apparent from the ensuing specification and drawing as follows:

FIGURE 1 is a diagrammatic showing of a braking system incorporating the invention.

FIGURE 2 is a schematic view of a hydraulic pressure switch in one setting.

FIGURE 3 is a view similar to FIGURE 2 with a different setting.

Referring to the drawing, I have shown schematically a braking system of an automotive vehicle wherein the master cylinder 10 is of the tandem type wherein one chamber is provided for supplying brake fluid to the front wheel brakes and another chamber provides brake fluid to the rear wheel brakes. Both chambers are utilized simultaneously by the actuation of a single brake pedal 11 of the suspended type. When the brake pedal is depressed, the dual master cylinder sends brake fluid simultaneously to the wheel cylinders 12 and 13 through the tubing 14, 14a and 14b and to the wheel cylinders 15 and 16 through the tubing 17, 17a and 17b. The foregoing type of dual brakes are well known and the master cylinder is not shown in detail.

Tubing 14 has a branch 19 and tubing 17 has a branch 20 leading respectively to hydraulic pressure responsive switches 21 and 22 which are both of conventional construction, each having three terminals 23, 24 and 25 and 23a, 24a and 25a respectively. Each of switches 21 and 22 has a switch arm 21a and 22a respectively, such arms being in continuous contact with terminals 24 and 24a respectively, as shown in FIGURES 2 and 3. Terminals 23 and 23a are connected to conductor wires 23c and 23d respectively and wires 23c and 23d are both connected to conductor wire 23b. Terminals 24 and 24a are connected to conductor wires 24c and 24d respectively and wires 24c and 24d are both connected to conductor wire 24b which in turn is connected to the rear brake lamps 30 and 31. When wire 24b is energized the brake lamps 30 and 31 are on. Terminals 25 and 25a are connected to conductor wires 25c and 25d respectively and wires 25c and 25d are both connected to conductor wire 25b which leads to the elongated terminal 33 of the ignition switch 34. Whenever the ignition switch 34 is closed a source of potential is present in wire 25b, in branch wires 25c and 25d and in pressure switch terminals 25 and 25a. The circuit to one of the pressure switches (for example switch 22) would commence at battery 44, and include wire 45, ignition switch arm 35, wire 46, wire 25b, wire 25d and terminal 25a. Since switch arm 22a is closed between terminals 25a and 24a, then wires 24d and 24b are energized causing the brake lamps 30 and 31 to be turned on (said lamps both leading to ground). Assuming that pressure switch 21 is in the condition as shown in FIGURE 2 wherein the switch arm 21a is closed between terminals 23 and 24, then wires 23c and 23b would be energized, thus energizing coil 58 which leads to ground. The conditons under which coil 58 is energized occurs as follows. Switch 22 is in a condition in which switch arm 22a is closed between terminals 24a and 25a. Since terminal 25a is energized (as is explained heretofore), then terminal 24a and wires 24d and 24b are energized. The energizing of wire 24b also energizes wire 24c and terminal 24. Terminal 24 being closed relative to terminal 23 thereby energizes wires 23c, 23b and coil 58 which leads to ground.

The ignition includes switch arms 35 and 36 which are mechanically interconnected by member 37. When the arm 35 is swung to "car start position" the arm is moved to the maximum limit of counter-clockwise direction (viewing FIGURE 1). In this position, arm 35 engages terminal 38 which is connected to the starter motor (not shown). Arm 35 also remains engaged with the elongated terminal 33. Additionally, when the arm is in car starting position, then arm 36 closes with terminal 40. Thus, with arm 36 in contact with terminal 40 and arm 35 in contact with terminals 33 and 38, the signal lamp 42 goes on and remains so until arm 35 is moved back to "running position" as shown by the dotted line 43 in FIGURE 1. With switch arm 35 in "running position" the arm 36 is open with reference to terminal 40, thereby opening the circuit which previously energized the lamp. Such circuit includes the battery 44, conductor wire 45, arm 35, terminal 33, conductor wires 46 and 47, lamp 42, conductor wires 48 and 49, terminal 40, arm 36 and conductor wire 50, thence to ground.

Thus, the signal lamp 42 goes on each time the car is started and serves to establish that the lamp is not burned out and that the circuitry previously described is functioning properly. After the car is started and arm 36 is open with reference to terminal 40, then the signal lamp is de-energized until the contacts 52 and 53 of the latching relay 54 become closed. This would occur only if some defect in the braking system occurs. This will be described hereinafter.

Each of the hydraulic pressure switches 21 and 22 normally operate simultaneously, however, if one switch should lag behind the other in operation, then a time delay device in the form of a dashpot 56 will prevent any momentary closing of contacts 52 and 53. Usually the time involved in lagging is not more than two-tenths of a second and thus the dashpot serves to prevent any momentary lighting of lamp 42.

The hydraulic switches are set so that under low or zero pressure the terminals 23 and 23a and 24 and 24a are closed and 25 and 25a are open. Under these conditions neither the brake lamps 30 and 31 nor lamp 42 are energized. Under braking pressure (which may be in the area of about 60 lbs. per square inch) the terminals 23 and 23a are open and terminals 24 and 24a and 25 and 25a are closed. Under these conditions the brake lamps 30 and 31 are energized but lamp 42 is not energized. The schematic showing in FIGURE 2 shows the condition of pressure switch 21 under low or zero pressure and the showing in FIGURE 3 shows the condition of switch 22 under braking pressure. Under these conditions there would be a braking system defect consisting of loss of pressure in switch 21 occasioned as a result of a leak in hydraulic lines 14, 14a or 14b. The brake lamps 30 and 31 would be on (switch 22 being pressurized) and the signalling lamp 42 would also be on.

Assuming that the hydraulic system to the front brakes becomes defective and the pressure in tubing sections 14, 14a and 14b is low or at zero, then the switch 21 will be in a condition as shown in FIGURE 2 (with terminal 25 being open). The rear brakes are not defective and are at braking pressure and switch 22 will be in a condition as shown in FIGURE 3 (with terminals 24a and 25a being closed and terminal 23a being open). Thus both wires 23b and 24b are energized—24b as a result of switch 22 and wire 23b as a result of both switches (as previously explained herein). Wire 24d is energized by switch 22 through terminal 24a and will energize wires 23c and 23b through switch 21. Relay coil 58 is energized and causes contacts 52 and 53 to close and they will remain closed due to latch 59 and armature 60. It will be understood that relay coil 58, in practice, will be mounted within the frame or casing so as to be in alignment with armature 60 in order to effect the closing of contacts 52 and 53. A reset button 61 can be pushed against latch 59 to cause the armature 60 to be freed for movement to permit contacts 52 and 53 to open.

When the contacts 52 and 53 are closed, a circuit is completed commencing from battery 44 and continuing with wire 45, arm 35, terminal 33, wire 46, wire 47, lamp 42, wire 48, wire 62, contacts 53 and 52, armature 60, then to ground. The signal lamp is on during the period that the aforegoing circuit is closed. When the defect in the braking system of the front brakes is rectified, then the actuation of the reset button 61 is in order.

I claim:

1. For use with a vehicle having a fluid supply cylinder, a front set of brakes and a rear set of brakes and fluid supply conduits extending from the fluid supply cylinder to each set of brakes, apparatus for signalling the faulty performance of a set of brakes comprising.
   (a) pressure responsive electrical switches mounted in the fluid supply conduits;
   (b) a relay having electrical contacts and including a coil and an armature movable relative to the coil when the coil is electrically energized to close the contacts;
   (c) a conductor having one end connected to the coil and its other end connected to each pressure responsive switch;
   (d) an ignition switch having first and second terminals and a conductor extending from the second terminal to each pressure responsive switch;
   (e) a battery and a conductor extending therefrom to the first terminal of the ignition switch;
   (f) a signalling device;
   (g) a conductor having one end connected to one of the relay contacts and its other end connected to the signalling device, said signalling device also connected to the conductor leading from the second terminal of the ignition switch.

2. Apparatus as set forth in claim 1 wherein an auxiliary switch includes a switch arm and first and second terminals and wherein the ignition switch includes a switch arm, said switch arms being mechanically interconnected, and a conductor extends from the second terminal of the auxiliary switch to the signalling device and the first terminal of the auxiliary switch is connected to ground.

3. Apparatus as set forth in claim 1 wherein the relay includes a time delay device which delays the closing of the relay contacts.

4. Apparatus as set forth in claim 1 wherein a latching mechanism maintains the relay contacts in closed condition and manual means are provided for releasing the latching mechanism.

5. Appaartus as set forth in claim 1 wherein each pressure responsive switch has three terminals and one of such terminals is constantly connected to ground.

References Cited

UNITED STATES PATENTS 2,694,191  11/1954  Falanga et al. _____ 340—60
3,011,595  12/1961  Heiss et al. _____ 340—52

JOHN W. CALDWELL, *Primary Examiner.*

ALVIN H. WARING, *Assistant Examiner.*

U.S. Cl. X.R.

200—81.4; 340—60